United States Patent
Mansour

(10) Patent No.: US 8,428,378 B2
(45) Date of Patent: Apr. 23, 2013

(54) POST-BEAMFORMER ULTRASOUND COMPRESSION

(75) Inventor: Mohamed Farouk Mansour, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 225 days.

(21) Appl. No.: 13/045,477

(22) Filed: Mar. 10, 2011

(65) Prior Publication Data

US 2011/0222791 A1 Sep. 15, 2011

Related U.S. Application Data

(60) Provisional application No. 61/312,728, filed on Mar. 11, 2010.

(51) Int. Cl.
G06K 9/36 (2006.01)
G06K 9/46 (2006.01)

(52) U.S. Cl.
USPC ............ 382/240; 382/250; 382/251; 382/281

(58) Field of Classification Search .................. 382/240, 382/250, 251, 281
See application file for complete search history.

(56) References Cited

U.S. PATENT DOCUMENTS

| 6,042,545 A * | 3/2000 | Hossack et al. ............... 600/443 |
| 2008/0008395 A1* | 1/2008 | Liu ............................. 382/244 |
| 2010/0240996 A1* | 9/2010 | Ionasec et al. ................ 600/443 |

OTHER PUBLICATIONS

Ramchandran, Kannan et al., "Wavelets, Subband Coding, and Best Bases," Proceedings of the IEEE, Apr. 1996, pp. 541-560, vol. 84, No. 4, IEEE.
Mansour, Mohamed, "Joint Optimization of Wavelet Tree/Filter in Orthogonal Wavelet Packet Transform," submitted to IEEE Signal Processing Letters, Nov. 2010, 4 pages, (unpublished).

* cited by examiner

*Primary Examiner* — Phuoc Tran
(74) *Attorney, Agent, or Firm* — Alan A. R. Cooper; Wade J. Brady, III; Frederick J. Telecky, Jr.

(57) ABSTRACT

Embodiments of the invention compress ultrasound RF data after the receiver beamformer. An efficient compression algorithm is disclosed that incorporates the use of the Discrete Cosine Transform (DCT) and the Discrete Wavelet Packet (DWP) transform, followed by quantization of the wavelet coefficients. The algorithm first processes ultrasound scanlines from the receiver beamformer using a DCT transform. In a low-power configuration, a Hadamard transform may be used instead of the DCT. The output of the DCT processing is DCT coefficients at different frequencies. An optimized wavelet packet transform is then used for each coefficient line. The wavelet filter kernels and the wavelet packet trees can be jointly optimization using a two-step optimization algorithm.

17 Claims, 4 Drawing Sheets

POST-BEAMFORMER ULTRASOUND COMPRESSION

CROSS-REFERENCE TO RELATED APPLICATIONS

This application claims the benefit of the filing date of U.S. Provisional Patent Application No. 61/312,728, which is titled "Method for Post Beam-Former Ultrasound Compression" and was filed Mar. 11, 2010, the disclosure of which is hereby incorporated by reference herein in its entirety.

TECHNICAL FIELD

Embodiments of the invention are directed, in general, to generating ultrasound images and, more specifically, to post-beamformer compression of ultrasonic data.

BACKGROUND

A common type of imaging device is a pulse-echo imaging device comprising multiple transducers that transmit pulses towards a target to be imaged. The imaging device receives echoes that are reflected from the target back to the transducers. By analyzing these echoes, the imaging device creates an image of the target that reflected the pulses. An example of such a pulse-echo imaging device is an ultrasound imaging device. Beamforming is a common signal-processing technique used in ultrasound imaging devices. A beamformer generates signals to be transmitted by a transducer array and processes the echo signals received by the transducers. An image is generated from the beamformer output signal and is then displayed to the user.

Using beamforming techniques, the ultrasound imaging device can control directional and spatial aspects of the transmitted and received signals. In medical ultrasound, beamforming focuses echo signals received from reflections off different tissue structures. The receive beamformer creates a pattern of beams that are pointing in the same direction. Focusing is achieved by appropriately delaying the echo signals arriving at different transducers so that the received signals are aligned in an isophase plane.

Ultrasound machines typically comprise three distinct subsystems: a probe that includes the transducer elements, a front-end electronics section, and a back-end processor section that includes a user interface and display. It is typical for the probe to be separate from the front-end electronics section and to be coupled the front-end electronics by a cable assembly. The front-end and back-end electronics may be in a single device or in separate components. The subsystems in the ultrasound machine may be coupled using cable or wireline connections or over a wireless interface.

As ultrasound transducers increase in number and complexity, a corresponding increase is created in the amount and speed of data that must be transmitted and processed within ultrasound imaging devices. For example, ultrasound probes may employ tens of transducers for improved focusing. A typical phased-array ultrasound probe has 64-256 transducers each operating at a sampling frequency of 25-60 MHz and having a typical sampling resolution of 12 bits. As a result, the data throughput from the transducers to a receiver beamformer in a digital front end is in the order of tens of gigabits per second. This high throughput complicates the input/output interface of the digital front end of the ultrasound receiver by raising the threat of signal interference and loss along a transmission line leading from an analog front end to a digital front end in the ultrasound unit.

SUMMARY OF THE INVENTION

Embodiments provide an efficient system for the compression of ultrasound data. The system may be deployed after the receive beamformer and uses a two-dimensional decorrelation to significantly reduce the signal energy to achieve compression. Several optimization techniques may be used to improve the performance of baseline system. The system may be integrated with ultrasound analog front end systems to facilitate the interface circuitry between analog and digital front-ends and to reduce the required throughput. Embodiment may also be used to enable wireless connectivity cascaded with the receive beamformer. The compression system can operate in a fixed-bit rate or a fixed-distortion mode depending on the overall system requirements.

Embodiments further introduce a new orthogonal wavelet packet optimization framework that is based on the parameterization of the wavelet filter, which gives the flexibility of controlling the wavelet kernel at each tree node. The parameterization provides a direct matrix parameterization of the wavelet kernel filter of any order. The resulting wavelet coefficients are differentiable functions of the unknown decision variables which allows for using standard gradient search techniques for optimization. Differentiable objective functions that could be used for kernel computation using standard optimization techniques are introduced below. A two-step optimization algorithm comprises an iterative process that provides joint estimation of the wavelet tree and a single filter kernel for the whole tree as in the common wavelet packet transform. The objective of this optimization algorithm is sparse signal representation for signal compression/coding applications. The optimization of the wavelet kernel is based on the parameterization of compactly supported orthogonal wavelets.

Embodiments of the invention provide a framework for lossy compression of ultrasound data. The high throughput of ultrasound data is a major challenge in the design of the interface between analog and digital circuitry in ultrasound receivers. A typical ultrasound probe has a throughput order of tens of gigabits per seconds. Efficient compression of ultrasound data would in general reduce the interface cost and simplifies the design of the digital front end in the ultrasound receiver. Signal compression may be employed after the receiver beamformer to perform a two-dimensional decorrelation in both the lateral and axial directions. The decorrelation in the lateral direction uses a Karhunloeve-like transform, such as the Discrete Cosine Transform (DCT) or Hadamard transform. The decorrelation in the axial direction uses customized orthogonal wavelet packets that are optimized for a particular ultrasound probe.

Embodiments of the invention provide a system and method for compressing ultrasound RF data after the receiver beamformer. Disclosed is an efficient compression algorithm that incorporates the use of the Discrete Cosine Transform (DCT) and the Discrete Wavelet Packet Transform (DWP), followed by quantization of the wavelet coefficients. The algorithm first processes "N" ultrasound scan-lines (that are coming from the receiver beamformer) using an N×N DCT transform. In a low-power configuration, a Hadamard transform could be used instead of the DCT. The output of the DCT processing is N lines of DCT coefficients (at different frequencies). An optimized wavelet packet transform is then used for each coefficient line.

The wavelet packet tree could be optimized offline (using training data) or online (while compressing). The wavelet coefficients are then quantized using one of many choices of source coding schemes. The optimization of the wavelet tree can be performed using dynamic programming.

A quantization step may use one of many source coding algorithms that could be selected according to the signal statistics. First, the wavelet coefficients are segmented into frames, and each frame is quantized using a fixed set of parameters. If the maximum absolute value of the frame samples is one, then a special procedure for encoding $-1,0,-1$ is used where a single bit is assigned to zero, and two bits are assigned to $+1,-1$. For other frames, the number of bits for each sample is determined by the maximum absolute value of the frame samples, which is sent as side information. The quantization may be performed using PCM quantization or Golomb coding.

The example embodiments use two transforms to decorrelate the ultrasound signal in the lateral and axial directions. Wavelet packet optimization could be used online or offline to optimize performance. An advantage of these embodiments is the high decorrelation of input samples, and the efficient wavelet packet representation after the tree optimization algorithms.

BRIEF DESCRIPTION OF THE DRAWINGS

Figure 1:
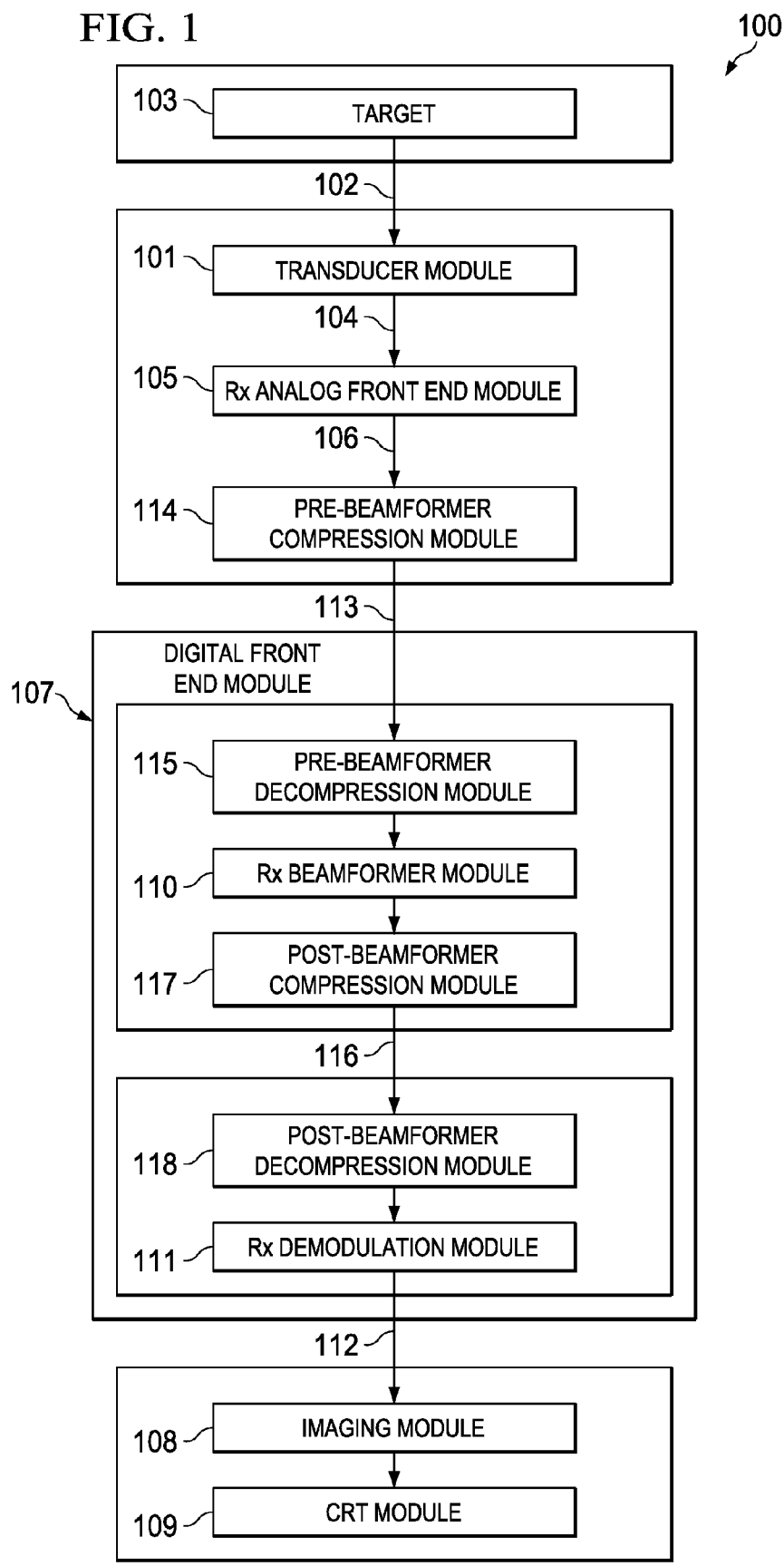
Figure 2:
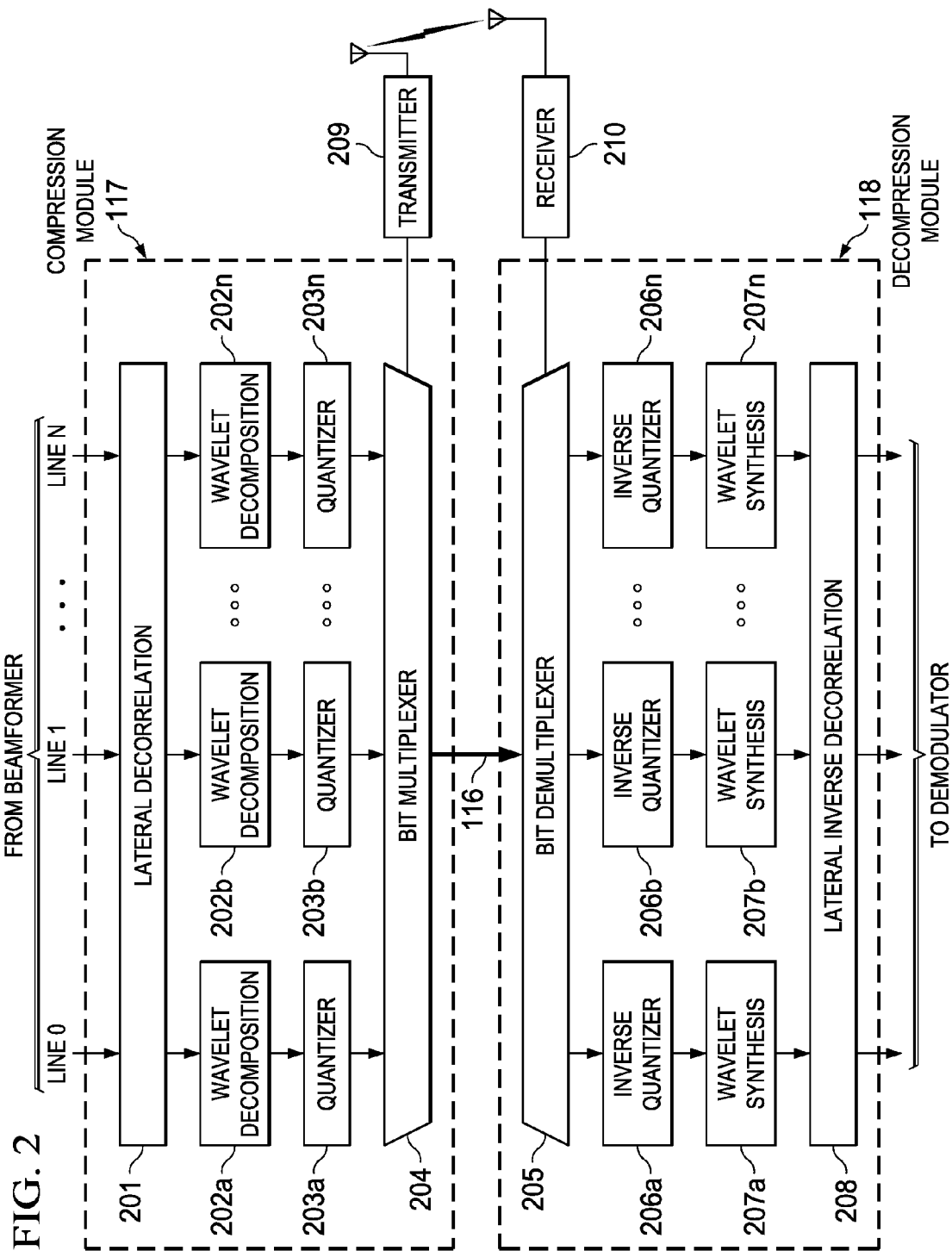
Figure 3:
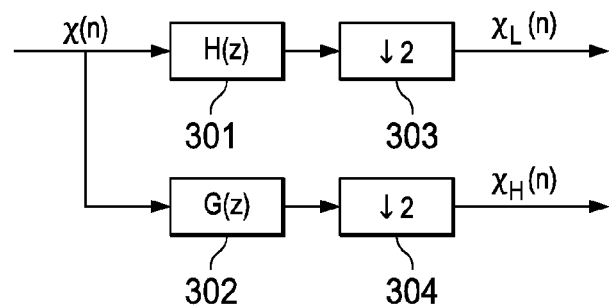
Figure 4:
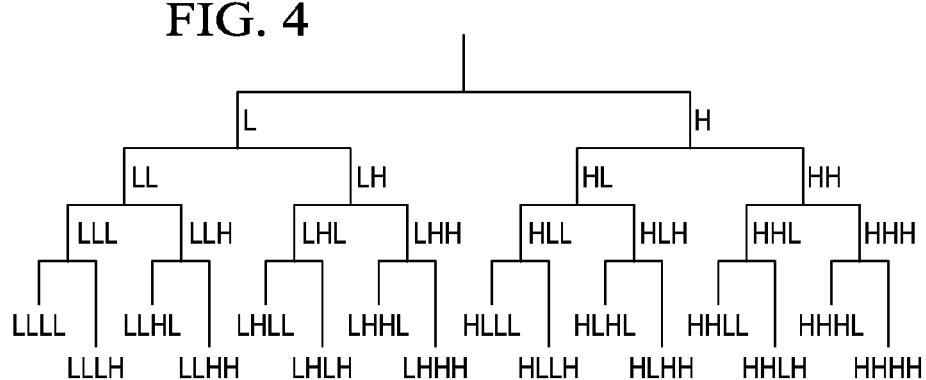
Figure 5:
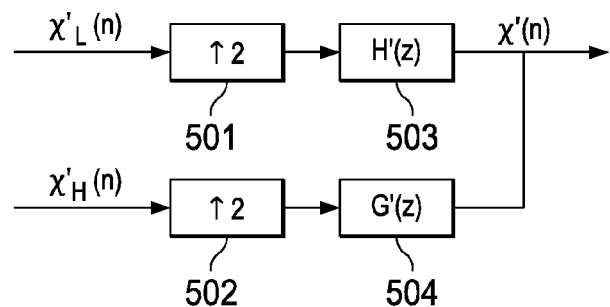

Having thus described the invention in general terms, reference will now be made to the accompanying drawings, wherein:

FIG. 1 is a block diagram showing the receiver portion of an imaging device according to disclosed embodiments;

FIG. 2 is a block diagram showing post-beamformer compression module and post-beamformer decompression module of imaging apparatus according to one embodiment;

FIG. 3 is a block diagram showing a wavelet decomposition element within the wavelet decomposition circuits according to one embodiment;

FIG. 4 is a diagram showing a wavelet decomposition tree according to disclosed embodiments; and FIG. 5 is a block diagram showing a wavelet synthesis element from a wavelet synthesis circuit of decompression module according to one embodiment.

Figure 6:
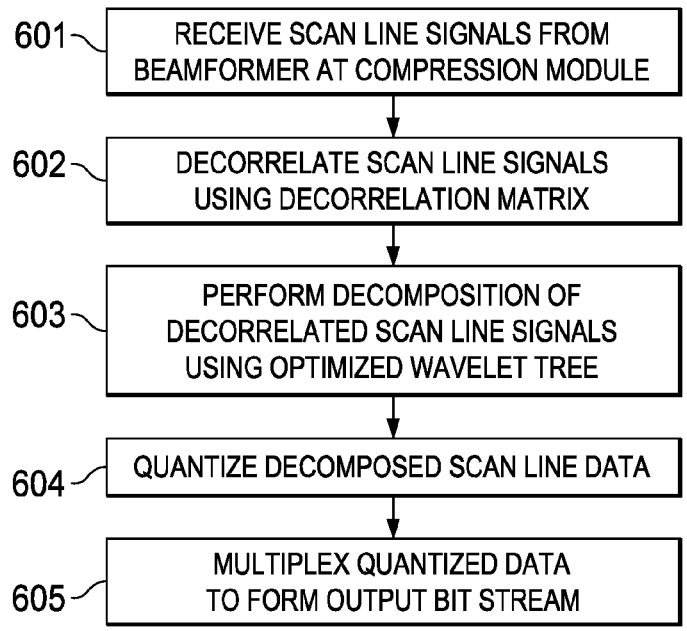

FIG. 6 is a flowchart illustrating a data compression operation according to one embodiment.

Figure 7:
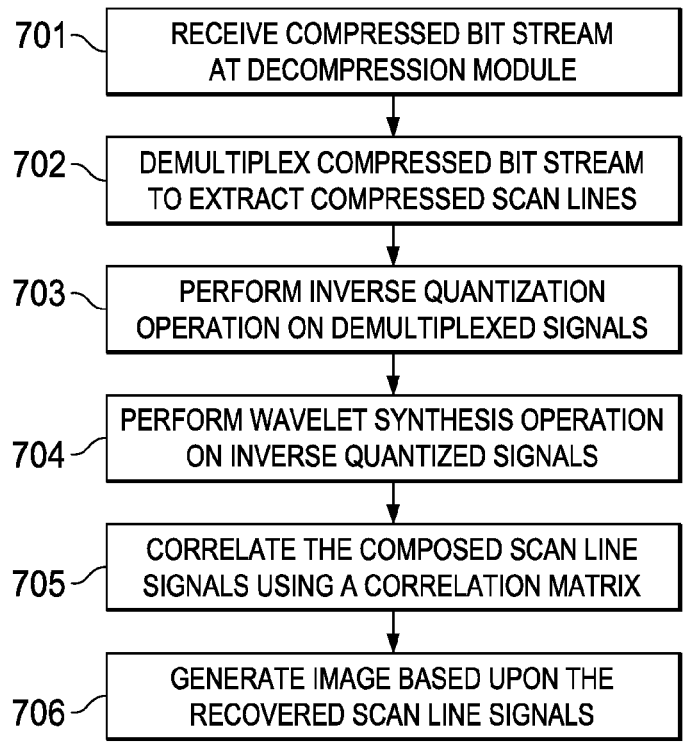

FIG. 7 is a flow chart showing a decompression operation according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Imaging Device

FIG. 1 is a block diagram showing the receiver portion of an imaging device 100 according to disclosed embodiments. The imaging device includes a plurality of transducers in transducer module 101, which receives echo signals 102 from a target 103 that is being imaged. The plurality of transducers operate to send a plurality of transmitted pulses to target 103 and to receive a plurality of echo pulses 102 reflected from the target 103. In one embodiment, imaging device 100 is an ultrasound imaging device in which the transducers transmit ultrasonic pulses and receive ultrasonic reflections. However, in alternate embodiments, the imaging device could be any sort of pulse-echo imaging system. In particular, alternate embodiments could be radar imaging systems in which the transducers transmit radio frequency (RF) pulses and receive RF reflections. The transducer module 101 converts the reflected echo pulses 102 into base imaging signals 104 that are indicative of the reflected pulses. These base imaging signals could be RF signals, optical signals, or the like.

Receiver Analog Front End (Rx AFE) module 105 operates to clean up the base imaging signals 104 before further operations. AFE module 105 performs front end processing on the base imaging signals 104 to generate initial imaging signals 106 that are sent through Digital Front End (DFE) module 107 to imaging module 108 for further processing and display on CRT module 109. In one embodiment, the AFE module 105 provides amplification, operations, and analog-to-digital conversion. However, in other embodiments, any desirable front end processing may be performed in AFE module 105.

DFE module 107 prepares the initial imaging signals 106 for processing by the imaging module 108. In one embodiment, DFE module 107 comprises receive beamformer module 110 and receive demodulation module 111. DFE module 107 processes the recovered imaging signals 106 to generate imaging data 112. Imaging module 108 then uses the imaging data 112 to generate an image on CRT module 109.

The high throughput of data in an ultrasound imaging device is a major challenge in the design of the interface between analog and digital circuitry in ultrasound receivers. A typical ultrasound probe has a throughput order of tens of gigabits per seconds. Efficient compression of ultrasound data would generally reduce interface costs and simplify the design of the digital front end in the ultrasound receiver.

In one embodiment, compression of the ultrasound RF data may be performed before receiver beamformer module 110 (i.e. pre-beamformer compression). The amount of data sent across transmission line or cable 113 can be reduced using pre-beamformer (Pre-BF) compression module 114 and Pre-BF decompression module 115. An example of a system incorporating such pre-beamformer compression/decompression is disclosed in pending U.S. patent application Ser. No. 12/872,236 filed Aug. 31, 2010 and titled "SYSTEM AND METHOD FOR IMAGING," the disclosure of which is hereby incorporated by reference herein in its entirety.

In the embodiments disclosed in further detail herein, the ultrasound imaging device may use post-beamformer (Post-BF) compression to reduce the data transmitted across interface 116 between beamformer module 110 and receive demodulation module 111. Interface 116 may be a cable or other wireline connection, or it may be a wireless link between beamformer module 110 and receive demodulation module 111. Post-BF compression module 117 compresses the imaging signals from beamformer 110, and Post-BF decompression module 118 recovers the compressed imaging signals.

Compression/Decompression Modules

FIG. 2 is a block diagram showing post-beamformer compression module 117 and post-beamformer decompression module 118 of imaging apparatus 100 (FIG. 1) according to one embodiment.

Compression module 117 includes lateral decorrelation circuit 201, wavelet decomposition circuits 202*a*-202*n*, quantizers 203*a*-203*n*, and bit multiplexer 204. Decorrelation circuit 201 receives an array of N scan lines from the beamformer and then decorrelates the N imaging signals using an N×N decorrelation matrix D. By multiplying the array of N imaging signals by the decorrelation matrix D, decorrelation circuit 201 generates a corresponding array of N decorrelated imaging signals.

The decorrelation matrix D employed by the decorrelation circuit 201 is a square matrix with a height and width equal to the size of the array of initial scan lines. For example, if eight scan lines are used (corresponding to eights transducers, or N=8), then the decorrelation matrix D would be an eight-by-eight matrix. This ensures that the resulting array of decorrelated signals will be of the same size as the array of scan lines.

The decorrelation matrix D is selected to minimize the redundancy across the scan line signals. In particular, it is chosen such that most of the energy is passed across the first line in the array of decorrelated scan line signals, and that the least amount of the energy is passed across the last line in the array of decorrelated scan line signals, with a decreasing amount of energy across the array of decorrelated scan line signals.

In one embodiment a Hadamard matrix is used as the decorrelation matrix D. An 8×8 Hadamard matrix is shown here by way of example:

$$D = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (1)$$

In another embodiment a discrete cosine transfer (DCT) matrix can be used as the decorrelation matrix D. Each of the elements in a DCT matrix can be determined by the following formula:

$$D(m, n) = \cos\left(\frac{\pi m}{8}\left(n + \frac{1}{2}\right)\right) \quad (2)$$

The wavelet decomposition circuits 202a-202n receive the N decorrelated scan line signals, respectively, and each performs a decomposition of a corresponding decorrelated scan line signal using an optimized wavelet tree to generate a corresponding decomposed scan line signal. In this embodiment a different optimized wavelet tree will be used for each wavelet decomposition circuit 202a-202n, as will be described in more detail below.

The quantizers 203a-203n each receive a corresponding decomposed scan line signal and quantize it into a quantized scan line signal having a bit value. In the disclosed embodiment, the quantizers employ a memoryless two-stage quantization procedure. A first stage uses a smaller number of bits (e.g., 2 or 3) with an overflow flag. Once overflow occurs, however, full quantization with variable bits is used. In addition, if the whole frame is zero, a flag is set in the header and no data is sent, while if the whole frame $\epsilon\{-1,0,1\}$, then special coding is used.

Although a particular quantization scheme is disclosed by way of example, alternate embodiments can employ any suitable quantizer. For example the quantizers 203a-203n may employ Huffman coding, Golomb coding, arithmetic coding, or any suitable quantization coding technique. Furthermore, devices with greater system resources can employ comparatively more complex source coding.

Bit multiplexer 204 receives the quantized scan line signals from the quantizers 203a-203n and combines then into a compressed bit stream that is sent over the interface 116 to decompression module 118.

FIGS. 3 and 4 provide additional detail regarding the operation of the wavelet decomposition circuits 202a-202n (FIG. 2). FIG. 3 is a block diagram showing a wavelet decomposition element 300 within the wavelet decomposition circuits 202a-202n according to one embodiment. FIG. 4 is a diagram showing a wavelet decomposition tree 400 according to disclosed embodiments.

As shown in FIG. 3, wavelet decomposition element 300 includes low-pass decomposition filter 301, a high-pass decomposition filter 302, a first downsampling circuit 303, and a second downsampling circuit 304. Low-pass decomposition filter 301 performs a low-pass filter operation H(z) on an incoming signal x(n), while high-pass decomposition filter 302 performs a high-pass filter operation G(z) on the incoming signal x(n). In one embodiment, low-pass decomposition filter 301 and high-pass decomposition filter 302 are complementary filters having thresholds that are substantially similar.

There are a number of choices for the mother wavelet that is employed by the wavelet decomposition circuit 300. In one embodiment, a quadrature mirror filter (QMF) with a desired number of taps (e.g., a 10-tap finite impulse response filter) is used. In alternate embodiments, a Haar wavelet may be employed. With the Haar wavelet, the following equations are true:

$$H(z)=[1,1] \quad (3)$$

$$G(z)=[1,-1] \quad (4)$$

The output of low-pass decomposition filter 301 is sent to the first downsampling circuit 303, which samples by two (i.e., samples every other value) to generate a low frequency coefficient stream $x_L(n)$. Similarly, the output of high-pass decomposition filter 302 is sent to the second downsampling circuit 304, which samples by two to generate a high frequency coefficient stream $x_H(n)$.

Multiple wavelet decomposition elements 300 are arranged in a tree format to allow for iterative decomposition in multiple stages. In operation, the low frequency coefficient stream $x_L(n)$ and the high frequency coefficient stream $x_H(n)$ from a given wavelet decomposition element 300 can be provided as an incoming signal x(n) to another wavelet decomposition element 300 at a lower level in the tree.

FIG. 4 is a diagram showing a wavelet decomposition tree 400 according to one embodiment. As shown in FIG. 4, the wavelet decomposition tree 400 has a depth of four and all of the branches are expanded. In actual embodiments, however, wavelet decomposition tree 400 for a given wavelet decomposition circuit 202a-202n may have some branches that are not expanded.

In the wavelet decomposition tree 400 illustrated in FIG. 4, the letter "L" is used to show a low-pass filter branch and the letter "H" is used to show a high-pass filter branch. Thus, the sixteen four-letter indicators at the end of each branch indicate how that path was filtered at each stage. For example, the end branch HHLH has passed through a high-pass filter at the first stage, a high-pass filter at the second stage, a low-pass filter at the third stage, and a high-pass filter at the fourth stage. In embodiments in which a particular branching is not expanded, it could be referred to by an X at that position, rather than an L or H. Thus, if the second branching of the end branch above were not expanded, it could be referred to as HXLH.

The objective function in the design of each wavelet decomposition tree 400 is to minimize the L1 norm of the leaf node of the tree. In this way, the resulting signals at the end branches will be very sparse, i.e., mostly zeroes.

Referring again to FIG. 2, decompression module 118 includes bit demultiplexer 205, inverse quantizers 206a-206n, wavelet synthesizing circuits 207a-207n, and correlation circuit 208. Decompression module 118 acts to reverse what was done in compression module 117 to recover the scan line signals from the beamformer.

Bit demultiplexer 205 receives the compressed bit stream from compression module 117 over interface 116 and extracts a plurality of demultiplexed imaging signals that correspond to the quantized scan line signals that were multiplexed into the compressed bit stream by the bit multiplexer 204.

Inverse quantizers 206a-206n each receive a corresponding demultiplexed scan line signal and perform an inverse quantization operation on the signal to generate a corresponding inverse quantized scan line signal. The inverse quantization operation corresponds to the quantization operation performed by quantizers 203a-203n in compression module 117.

Wavelet synthesizing circuits 207a-207n each perform a wavelet synthesis operation on a corresponding inverse quantized scan line signal using a wavelet synthesis tree that corresponds to the wavelet decomposition tree used in a corresponding wavelet decomposition circuit 202a-202n in the compression module 117. Wavelet synthesizing circuits 207a-207n generate first through $N^{th}$ composed scan line signals, respectively.

Lateral inverse decorrelation circuit 208 receives the array of N composed scan line signals from wavelet synthesizing circuits 207a-208n and then correlates the scan line signals using a N×N correlation matrix C. By multiplying the array of N composed scan line signals by the correlation matrix C, lateral inverse decorrelation circuit 208 generates a corresponding array of N recovered imaging signals.

FIG. 5 is a block diagram showing a wavelet synthesis element 500 from a wavelet synthesis circuit 207a-207n of decompression module 118 (FIG. 2) according to one embodiment. Wavelet synthesis element 500 includes first upsampling circuit 501, second upsampling circuit 502, low-pass reconstruction filter 503, and high-pass reconstruction filter 504. First upsampling circuit 501 receives a low-pass incoming signal $x'_L(n)$ and lengthens the signal by inserting zeroes between samples (i.e., inserting a zero for every other value). Similarly, second upsampling circuit 502 receives a high-pass incoming signal $x'_H(n)$ and lengthens the signal by inserting zeroes between samples. Low-pass reconstruction filter 503 performs a low-pass filtering operation H'(z) on the output of first upsampling circuit 501, while high-pass reconstruction filter 504 performs a high-pass filter operation G'(z) on the output of second upsampling circuit 502. In one embodiment, low-pass reconstruction filter 503 and high-pass reconstruction filter 504 are quadrature mirror filters (QMF) with respect to the low-pass decomposition filter 301 and the high-pass decomposition filter 302 of a corresponding wavelet deconstruction element 300 (FIG. 3). The outputs of low-pass reconstruction filter 503 and high-pass reconstruction filter 504 are then added together to generate the corresponding recovered signal x'(n).

As with the wavelet decomposition circuits 202a-202n, multiple wavelet synthesis elements 500 in the wavelet synthesis circuits 2071a-207n are arranged in a tree format to allow for iterative reconstruction over multiple stages. The recovered signal x'(n) from two different wavelet synthesis elements 500 at a lower level in the tree are provided as the low-pass incoming signal $x'_L(n)$ and the high-pass incoming signal $x'_H(n)$ for a wavelet synthesis elements 500 at a higher level.

The wavelet synthesis tree is the same as the corresponding wavelet decomposition tree. If optimization of the wavelet decomposition tree is performed offline, then a description of the wavelet synthesis tree are provided to the wavelet synthesis circuits 207a-207n prior to the device beginning operation. If the optimization is done online, then a description of the optimized wavelet tree must be sent with the bit stream. Thus, the imaging device can compress imaging data prior to being transmitted within the imaging device (e.g., over a transmission cable or wirelessly) and can then decompress the imaging data once transmission is complete. This is accomplished by sparsifying the scan line data across multiple lines (i.e., from multiple transducers) by decorrelating the data in two dimensions. This may also help reduce loss or interference during the transmission of the compressed image data. Furthermore, the compression ratio of the compressed data can be adjusted as need throughout the operation of the imaging device by adjusting the scaling in the quantizers 203a-203n and inverse quantizers 206a-206n.

In one embodiment, interface 116 between compression module 117 and decompression module 118 is a wireline interface, such as a data cable. In another embodiment, the compressed bit stream is transmitted from compression module 117 over a wireless to decompression module 118. For example, bit multiplexer 204 may be coupled to transmitter 209. The multiplexed, compressed bit stream may be sent to transmitter 209 instead of (or in addition to) being transmitted over interface 116. Transmitter 209 may use any appropriate wireless transmission protocol, such as IEEE 802.11, IEEE 802.16, Bluetooth, or proprietary protocol, to transmit the compressed bit stream to a receiver 210 as radio frequency (RF) signals. Receiver 210, operating on the same protocol as transmitter 209, receives the RF signals and extracts the compressed bit stream at decompression module 118. The received bit stream is then provided to bit demultiplexer 205 for decompression processing as described above.

Wavelet Optimization

In systems using post-beamformer compression, optimization may be performed at the line level. In one embodiment, the optimization algorithm may be run online for each line after the decorrelation matrix.

The maximum tree depth in the optimization of the wavelet tree depends on the signal structure and the axial depth of the signal. Small tree depth tends to provide more time-resolution and less frequency-resolution, and vice versa. Further, with large depth the transients at the signal boundaries become an important artifact and consume many bits to encode and this becomes a critical issue for power Doppler imaging. The typical depth ranges from six in case of B-mode imaging with a low-frequency probe, to only two for Doppler imaging with high frequency probes.

The wavelet tree should be available at the decompression module for perfect reconstruction. In case of adaptive tree estimation, the optimized wavelet tree for each line is sent as side information along with the compressed bit stream. Nevertheless, it has a minimal overhead and requires only a number of bits equal to the number of nodes in the tree. This contributes to less than 1% of the typical bit rate.

High-pass filter coefficients {g (n)} are usually computed from the low-pass filter coefficients {h(n)} as:

$$g(n)=(-1)^{n+1}H(N-1-n) \qquad (5)$$

In one embodiment, the low-pass filter $$h=[h(0) \ldots h(N-1)]' \quad (6)$$

is the solution of the linear system of equations:

$$\Gamma h=b \quad (7)$$

where $$b=[0\ 0\ \ldots\ 0\sqrt{2}]' \quad (8)$$

and $\Gamma$ is an N×N matrix that is parameterized by a vector $[v', \sigma']'$ of length $N/2+1$, which is defined as:

$$\Gamma(v,\sigma)=(\tilde{\gamma}_1\gamma_1 \ldots \tilde{\gamma}_{N/2-1}\gamma_{N/2-1}\tilde{u}'u')' \quad (9)$$

where u is an all-ones vector and $$\tilde{u} \triangleq (1-1 \ldots 1-1)' \quad (10)$$

and $\{\gamma_i\}$ are vectors of length N that are parameterized by the parameter vector $$(v,\sigma)=(v_1 \ldots v_{N/2-1}\sigma) \quad (11)$$

For $1 \leq i \leq N/2-1$ we have:

$$\gamma_i \triangleq [0v_{N/2-1} \ldots v_i-\sigma v_1 \sigma v_2 \ldots -\sigma v_{2i-1} \sigma v_{2i}]' \quad (12)$$

where it has N−2i zeros. Note that for $i \leq N/2$, $\gamma_i$ does not depend on $\sigma$. The above parameterization describes the wavelet filter coefficients as a continuous function of the unknown decision variables. This enables the deployment of standard optimization search techniques, such as gradient descent and Newton search, for optimizing differentiable objective functions.

Two-Step Optimization Algorithm

The two-step optimization aims at joint estimation of the wavelet tree and a single filter kernel for the whole tree as in the common wavelet packet transform. Two-step optimization is an iterative algorithm with two steps in each iteration. The algorithm starts with a one-step decomposition tree (i.e., a root and two leaf nodes). Then, the first step in each iteration fixes the wavelet tree and computes the kernel wavelet filter to optimize the objective function at the tree leaves. In this first step—i.e. wavelet kernel optimization—regularized forms of the L1-norm and L0-norm are used rather than the original norms to guarantee a smooth, differentiable objective function. The final objective function is the sum of the scores of the tree leaves. The second step in each iteration fixes the kernel filter and uses the single-tree algorithm to find the best tree structure that optimizes the objective function at its leaf nodes. The common single tree algorithm is a down-top dynamic programming algorithm that expands the full tree up to a predefined maximum depth using a single filter kernel and then recursively prune the tree leaves if the parent score is better than the score of its children. The optimization of the wavelet kernel is an unconstrained nonlinear optimization problem that is solved using standard nonlinear programming search techniques (e.g., gradient or Newton search algorithms). In the single-tree optimization, the exact objective function (e.g., L1-norm or L0-norm) could be used for simplicity rather than the regularized forms described above as it is a dynamic programming procedure and does not require a differentiable objective function. The two-step optimization algorithm uses a single filter kernel for the whole wavelet packet tree and uses alternate optimization of the wavelet filter and the wavelet packet tree so as to optimize the objective function at the tree leaves.

In the disclosed embodiments, the imaging apparatus is an ultrasound imaging apparatus. In this case, the transducers are ultrasonic transducers that emit an ultrasonic pulse and detect an ultrasonic echo. However, this is by way of example only. The disclosed system is equally applicable to any pulse-echo imaging system. For example, in alternate embodiments it could be applied to a radar imaging system in which the transducers are radio transducers that emit a radio frequency (RF) pulse and detect an RF echo. Application to other pulse-echo systems is likewise possible.

Compression Process

FIG. 6 is a flowchart illustrating a data compression operation according to one embodiment. The operation begins at step 601 when scan line signals are received at a compression module from a beamformer. These scan line signals may correspond to the signals received from the plurality of transducers in one embodiment and represent, for example, pulse echoes received by the plurality of transducers.

The scan line signals are decorrelated in step 602 using a decorrelation matrix. In one embodiment, this decorrelation can be accomplished by taking an array of scan line signals from the beamformer and multiplying that array by the decorrelation matrix to generate an array of decorrelated scan line signals. The decorrelation matrix should be a square matrix with a height and width equal to the height of the array of scan line signals to be processed. For example, if eight scan line signals are used, then the decorrelation matrix would be an eight-by-eight matrix. This ensures that the resulting array of decorrelated scan line signals will be of the same size as the array of initial scan line signals. The decorrelation matrix is selected to minimize the redundancy across the scan line signals. In particular, the matrix values are chosen such that most of the energy is passed across the first element or line in the array of decorrelated scan line signals, and that the least amount of the energy is passed across the last element or line in the array of decorrelated scan line signals, with a decreasing amount of energy across the array of decorrelated scan line signals. In one embodiment, the decorrelation matrix is a Hadamard matrix, and in another embodiment a DCT matrix may be used.

In step 603, wavelet decomposition is performed on the decorrelated scan lines. The decomposition is performed using an optimized wavelet tree. In one embodiment, a different optimized wavelet tree may be used for each line for decomposition. The wavelet kernel and wavelet tree may be optimized either online or offline. In one embodiment, a two-step optimization algorithm may be used.

In step 604, after the scan lines signals have been decomposed using the optimized wavelet tree, the decomposed signals are quantized using a suitable quantization operation to generate quantized signals. In one embodiment, a memoryless two-stage quantization procedure is used. However, alternative embodiments may use any suitable quantization operation. For example, the quantization operation may involve Huffman coding, Golomb coding, arithmetic coding, or any suitable quantization coding technique. Furthermore, systems with greater system resources can employ more complex source coding.

After the data is quantized, then a compression module output bit stream is generated in step 605 by multiplexing the quantized data.

It will be understood that the steps preformed in FIG. 6 may be performed in parallel for all input scan lines from the beamformer, or the steps may be performed iteratively for each scan line signal.

FIG. 7 is a flow chart showing a decompression operation according to one embodiment. The decompression operation begins when a compressed bit stream is received at a decompression module in step 701.

In step 702, a demultiplexer extracts compressed scan line signals from the compressed bit stream. In step 703, an inverse quantization operation is performed on the demultiplexed scan line signals to generate inverse quantized signals. The inverse quantization operation in step 703 is selected to correspond to the quantization operation performed in an associated compression operation, such as in step 604.

In step 704, the method then performs a wavelet synthesis operation on the inverse quantized signal to generate composed imaging signals. The wavelet synthesis operation uses a wavelet synthesis tree that corresponds to the wavelet decomposition tree used in a corresponding wavelet decomposition operation in the compression operation, such as in step 603. The wavelet synthesis operation generates composed scan line signals that match the corresponding decorrelated scan line signal in the related compression operation.

In step 705, the composed scan line signals are correlated using a correlation matrix. This can be accomplished by taking an array of composed scan line signals from step 704 and multiplying that array of scan line signals by the correlation matrix to generate an array of recovered scan line signals. The correlation matrix should be a square matrix of the same dimensions as the decorrelation matrix used in a corresponding compression operation, such as the decorrelation matrix used in step 602. The correlation matrix is selected to ensure that the resulting array of recovered scan line signals will correspond to the array of initial scan line signals that were received during the corresponding compression operation.

Once the recovered scan line signals are obtained, an image can be generated in step 706 based on the recovered scan line signals. It will be understood that the steps preformed in FIG. 7 may be performed in parallel for all scan lines in the compressed signal, or the steps may be performed iteratively for each scan line in the compressed signal.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. An signal processing device, comprising:
a decorrelation circuit configured to receive a plurality of initial scan line signals and to perform a decorrelation operation on the plurality of initial scan line signals to generate a plurality of decorrelated scan line signals;
a plurality of wavelet decomposition circuits coupled to the decorrelation circuit and configured to perform wavelet decomposition operations on the plurality of decorrelated scan line signals to generate a plurality of decomposed scan line signals;
a plurality of quantization circuits coupled to the plurality of wavelet decomposition circuits and configured to perform quantization operations on the plurality of decomposed scan line signals to generate a plurality of quantized scan line signals; and
a bit multiplexer coupled to the plurality of quantization circuits and configured to generate a compressed bit stream based on the plurality of quantized scan line signals.

2. The signal processing device of claim 1, further comprising:
a decompression module coupled to an output of the bit multiplexer and configured to convert the compressed bit stream into recovered scan line signals corresponding to the initial scan line signals.

3. The signal processing device of claim 2, wherein the decompression module is coupled to the output of the bit multiplexer via a data line.

4. The signal processing device of claim 2, wherein the decompression module is coupled to the output of the bit multiplexer via a wireless interface.

5. The signal processing device of claim 1, wherein the decorrelation circuit operates by multiplying an array of the initial scan line signals by one of a DCT matrix or a Hadamard matrix to generate the decorrelated scan line signals.

6. The signal processing device of claim 1, wherein the wavelet decomposition circuits each use a wavelet decomposition tree to perform the respective wavelet decomposition operations.

7. The signal processing device of claim 6, wherein the wavelet decomposition circuits are optimized using a two-step optimization algorithm.

8. The signal processing device of claim 7, wherein the two-step optimization algorithm is an iterative algorithm with two steps in each iteration, the two-step optimization algorithm begins with a one-step decomposition tree having a root and two leaf nodes,
in a first step in each iteration, the algorithm fixes the wavelet tree and computes a kernel wavelet filter to optimize an objective function at leaf nodes, and
in a second step in each iteration, the algorithm fixes the kernel filter and uses a single-tree algorithm to find a best tree structure to optimizes the objective function at the leaf nodes,
wherein a regularized objective function of L1 and L0-norm is used in the first step for filter kernel optimization, and an actual norm is used in the second step for tree optimization.

9. The signal processing device of claim 1, further comprising:
a decompression module comprising:
a bit demultiplexer configured to convert the compressed bit stream into recovered scan line signals corresponding to the initial scan line signals;
a plurality of inverse quantization circuits coupled to the bit demultiplexer and configured to perform inverse quantization operations on the recovered scan line signals to generate inverse quantized scan line signals; and
a plurality of wavelet synthesizing circuits coupled to the plurality of inverse quantization circuits and configured to perform wavelet synthesis operations on the inverse quantized scan line signals to generate synthesized scan line signals; and
a correlation circuit coupled to the plurality of wavelet synthesizing circuits and configured to receive the synthesized scan line signals and to perform a correlation operation on the synthesized scan line signals to generate correlated scan line signals.

10. An signal processing device, comprising:
a compression module, comprising:
a decorrelation circuit configured to receive a plurality of initial scan line signals and to perform a decorrelation operation on the plurality of initial scan line signals to generate a plurality of decorrelated scan line signals;
a plurality of wavelet decomposition circuits coupled to the decorrelation circuit and configured to perform wavelet decomposition operations on the plurality of decorrelated scan line signals to generate a plurality of decomposed scan line signals;

a plurality of quantization circuits coupled to the plurality of wavelet decomposition circuits and configured to perform quantization operations on the plurality of decomposed scan line signals to generate a plurality of quantized scan line signals; and a bit multiplexer coupled to the plurality of quantization circuits and configured to generate a compressed bit stream based on the plurality of quantized scan line signals;

a link interconnecting the compression module and a decompression module; and the decompression module comprising:

a bit demultiplexer configured to convert the compressed bit stream into recovered scan line signals corresponding to the initial scan line signals;

a plurality of inverse quantization circuits coupled to the bit demultiplexer and configured to perform inverse quantization operations on the recovered scan line signals to generate inverse quantized scan line signals; and a plurality of wavelet synthesizing circuits coupled to the plurality of inverse quantization circuits and configured to perform wavelet synthesis operations on the inverse quantized scan line signals to generate synthesized scan line signals; and a correlation circuit coupled to the plurality of wavelet synthesizing circuits and configured to receive the synthesized scan line signals and to perform a correlation operation on the synthesized scan line signals to generate correlated scan line signals.

11. The signal processing device of claim 10, wherein the link interconnecting the compression module and the decompression module comprises a data line.

12. The signal processing device of claim 10, wherein the link interconnecting the compression module and the decompression module comprises a wireless interface.

13. The signal processing device of claim 10, wherein the wavelet decomposition circuits and the wavelet synthesizing circuits are optimized using a two-step optimization algorithm.

14. The signal processing device of claim 13, wherein the two-step optimization algorithm is an iterative algorithm with two steps in each iteration, the two-step optimization algorithm begins with a one-step decomposition tree having a root and two leaf nodes, in a first step in each iteration, the algorithm fixes the wavelet tree and computes a kernel wavelet filter to optimize an objective function at leaf nodes, and in a second step in each iteration, the algorithm fixes the kernel filter and uses a single-tree algorithm to find a best tree structure to optimizes the objective function at the leaf nodes, wherein a regularized objective function of L1 and L0-norm is used in the first step for filter kernel optimization, and an actual norm is used in the second step for tree optimization.

15. An image processing method, comprising:

receiving initial scan line signals created by a beamformer circuit;

decorrelating the initial scan line signals using a decorrelation matrix to generate decorrelated scan line signals;

performing decompositions of the decorrelated scan line signals using wavelet trees to generate decomposed scan line signals, wherein an optimization algorithm is used to perform the decompositions;

performing quantization functions on the decomposed scan line signals to generate quantized scan line signals; and generating a compressed bit stream based on the quantized scan line signals.

16. The image processing method of claim 15, wherein the optimization algorithm is a two-step optimization algorithm.

17. The image processing method of claim 15, further comprising:

transmitting the compressed bit stream to a decompression module.

* * * * *